July 1, 1930.  A. J. ROBERTS  1,769,311
ILLUMINATION DEVICE FOR ADVERTISING AND SPECTACULAR PURPOSES
Filed Oct. 22, 1928   3 Sheets-Sheet 1

Patented July 1, 1930

1,769,311

UNITED STATES PATENT OFFICE

ALBAN JOSEPH ROBERTS, OF LONDON, ENGLAND

ILLUMINATION DEVICE FOR ADVERTISING AND SPECTACULAR PURPOSES

Application filed October 22, 1928, Serial No. 314,223, and in Great Britain October 24, 1927.

This invention relates to illumination devices for advertising and spectacular purposes, and has for its object to provide means for producing striking and variable effects from apparatus of simple construction.

The invention comprises an illuminated or advertising device consisting of an electric discharge tube containing a gas rendered luminous throughout the tube by an electric discharge, such tube being mounted as a radial arm on a rotating shaft and provided with means for supplying the tube with a high frequency or interrupted electric current.

The invention further comprises an illuminated or advertising device consisting of a straight or curved vacuum tube or like tube containing a gas or vapour rendered luminous by an electric discharge, mounted radially on a rotating shaft to which is supplied a high frequency or interrupted current in such a manner as to illuminate or expose the tube as a rotating radial arm, the current being of such a frequency that a word or device illuminated by the tube and carried thereon or rotated therewith will appear to be sufficiently stationary as to be distinctly read or seen.

The tube is rotatively supported on a suitable device and rotated by a motor and may be provided with an interrupter variable by hand or automatically.

The apparatus may be provided with any suitable number of luminous discharge tubes arranged as arms at any desired angular relation to one another, and all of these tubes may be arranged to radiate from the axis of rotation or some of them may be otherwise disposed in the plane of rotation. All of the tubes may be neon tubes or the device may consist of a combination of neon tubes and mercury vapour tubes.

Figure 1:
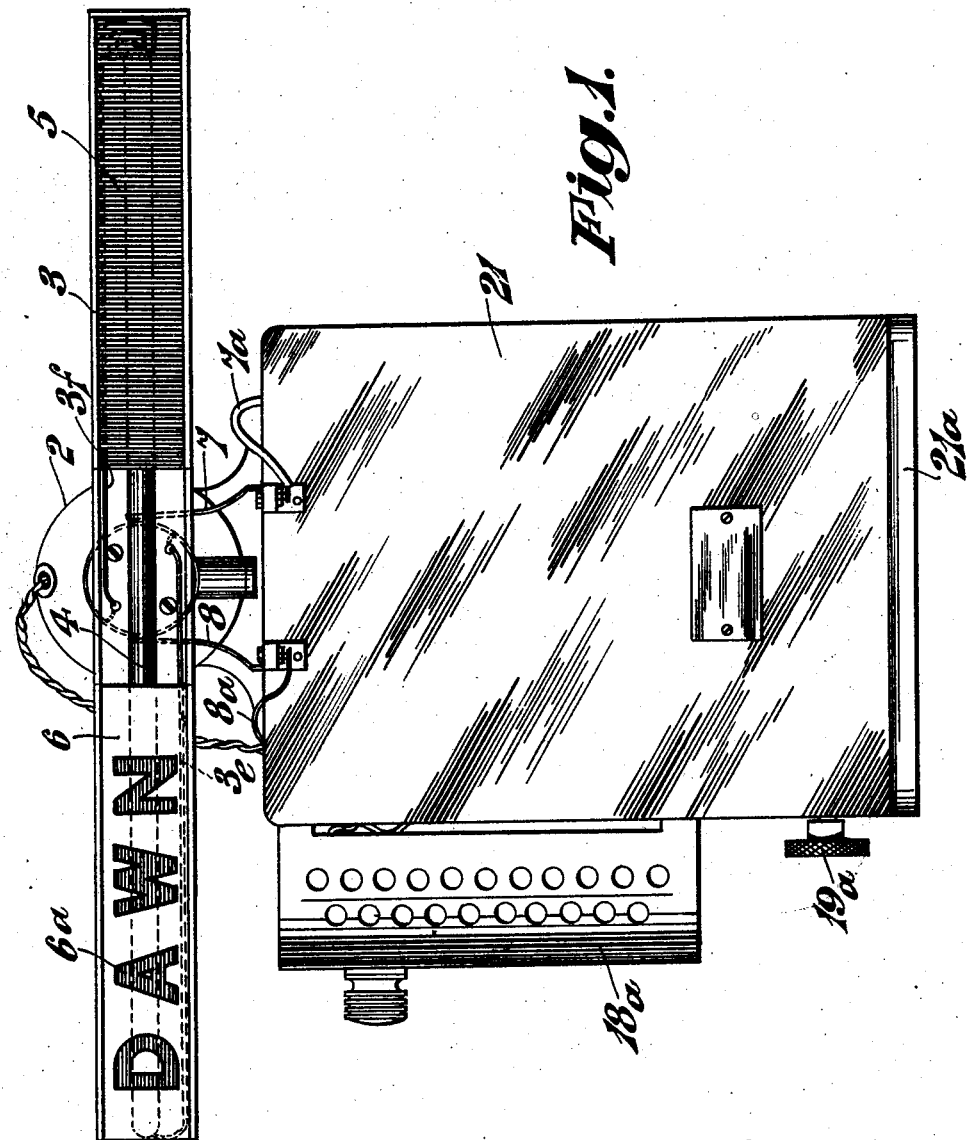
Figure 2:
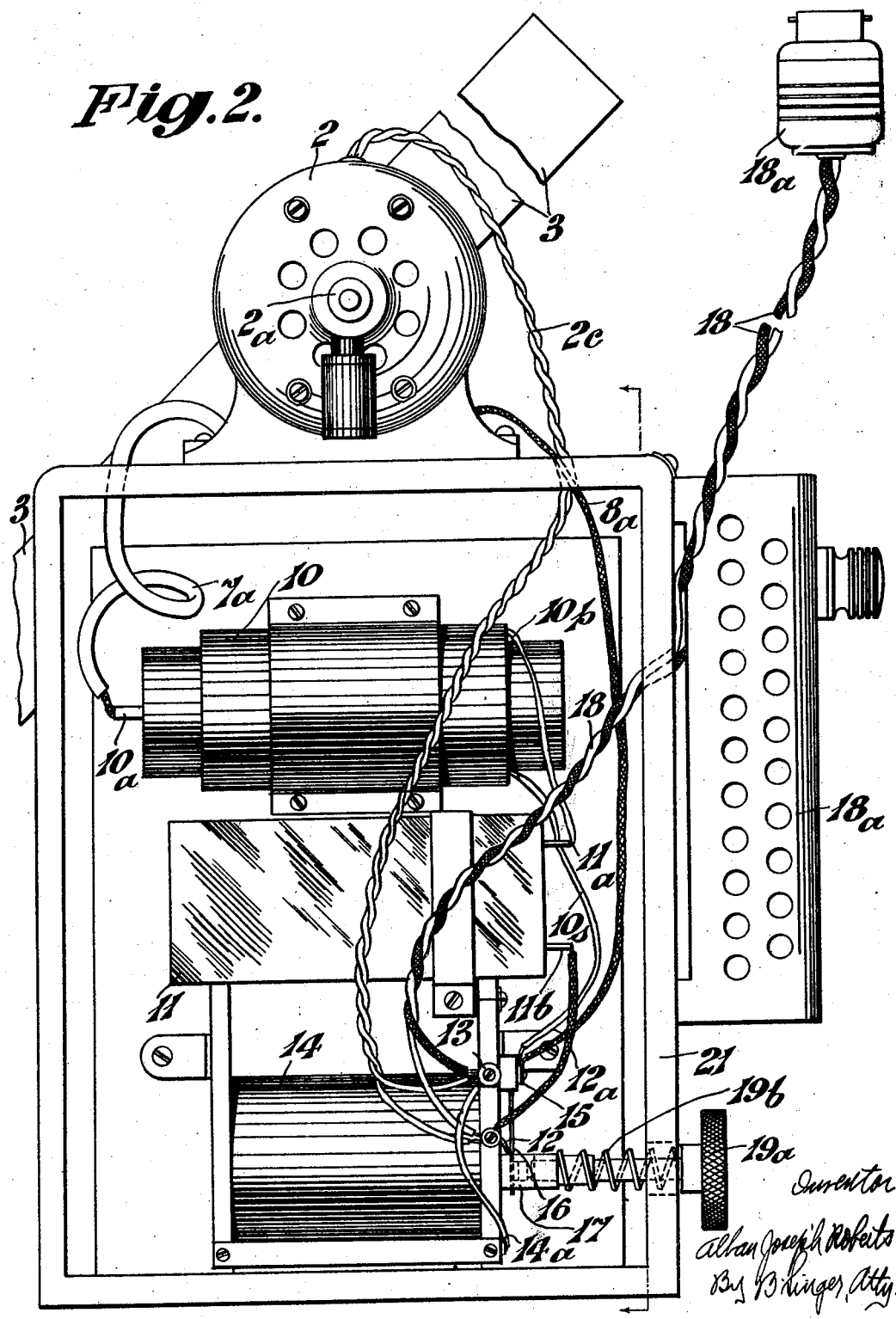
Figure 3:
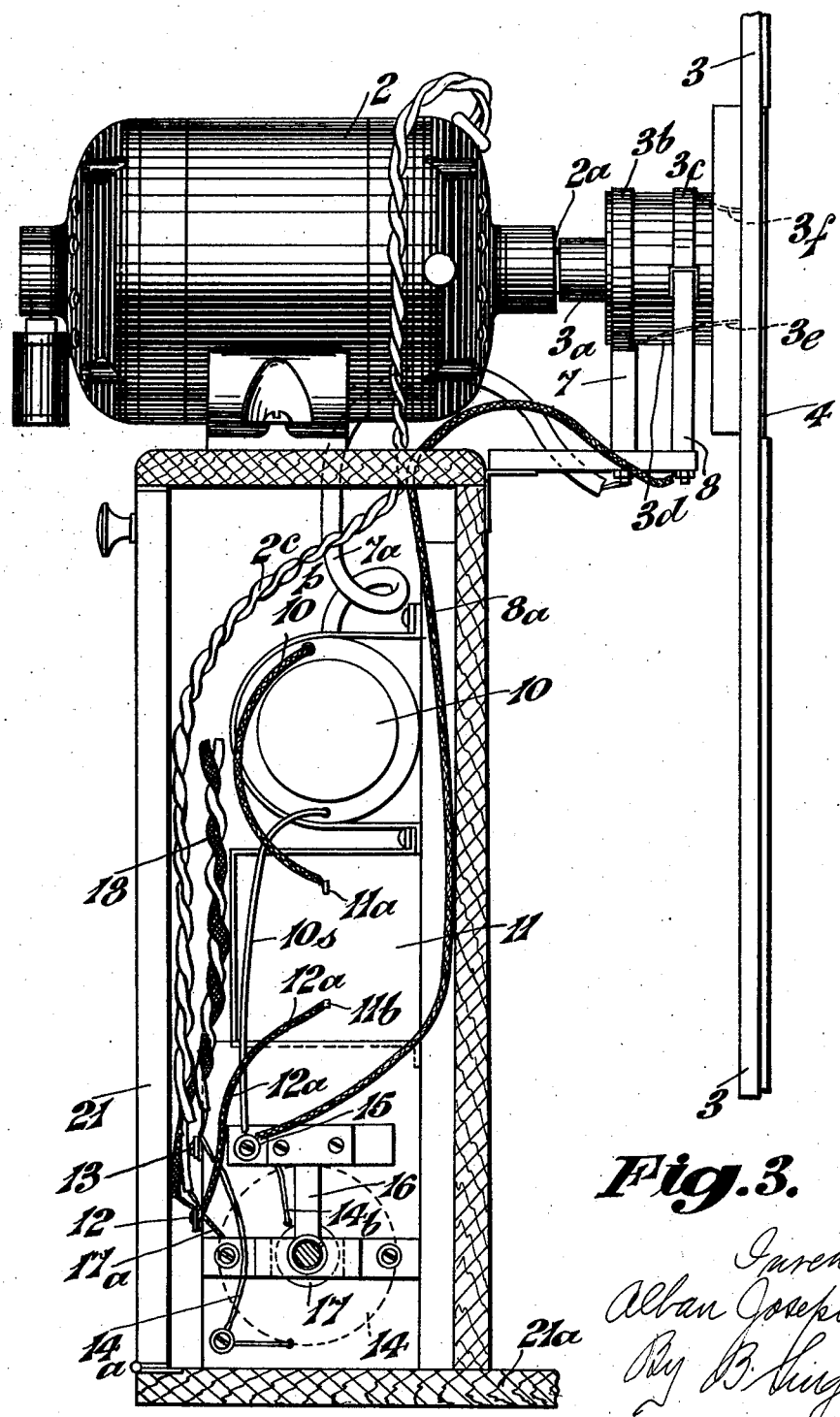

A manner of carrying out the invention is illustrated by the accompanying drawings wherein Fig. 1 is a general front view of the apparatus, while Fig. 2 is an inside rear view and Fig. 3 an inside side elevation of the apparatus on an enlarged scale.

In these drawings 2 is an electric motor, on the shaft $2^a$ of which is fixed the boss $3^a$ of a casing 3 which extends diametrically across the end of the shaft $2^a$ and is provided with a recess in which is mounted a neon or like tube 4. One end of the tube 4 is covered by an opaque substance 5 while the other end forms a luminous arm over a portion of which is fixed a sheet 6 of translucent or transparent material containing a word $6^a$ in opaque or coloured letters.

The boss $3^a$ of the casing is provided with slip rings $3^b$, $3^c$ arranged in a cylinder $3^d$ of insulating material through which are passed conductors $3^e$ and $3^f$ to the electrodes at the opposite ends of the tube 4.

On the slip rings $3^b$ and $3^c$ bear brushes 7 and 8 which are connected by leads $7^a$ and $8^a$ to the apparatus for supplying high frequency or interrupted currents.

In the apparatus shown, the lead $7^a$ is connected to one end $10^a$ of a secondary winding of a transformer 10. The end $10^p$ of the primary and secondary windings is connected to a terminal $11^a$ of a condenser 11 the other terminal $11^b$ of the condenser being connected by a lead $12^a$ to a main electric supply terminal 12. The other terminal 13 of the main electric supply is connected by a lead $14^a$ to one end of an interrupter coil 14, the other end of the interrupter coil 14 being connected by a lead $14^b$ to a terminal 15 at the fixed end of an interrupter 16. The contact terminal 17 of the interrupter is connected by a lead $17^a$ to the supply terminal 12.

The terminal 15 is connected by a lead $8^a$ to the electrode in the other end of the tube 14, and is also connected by a lead $10^s$ to the primary winding of the transformer 10.

The supply to the motor 2 is taken from the terminals 12 and 13 through a twin lead $2^c$, and the supply to these terminals from any suitable source is taken through a twin lead 18 provided at its end with a connecting plug $18^a$, an adjustable rheostat $18^b$ being provided in the lead 18.

The adjustment of the interrupter 16 is effected by a screw 19 provided with an external adjusting knob $19^a$ and is provided with a steadying spring $19^b$.

The apparatus is mounted in a casing 21 provided with a steadying base piece 21ª, the motor 2 being fixed on the top of the case.

The slip ring 3ᵇ, 3ᶜ may be substituted by or divided up to form a commutator giving any desired number of breaks per revolution.

The casing 3 or arms supporting the tubes 4 may be made of an oval or stream line cross section so as to offer as little resistance as possible to rotation in the air, the tubes may also be made of such a cross section.

What I claim and desire to secure by Letters Patent is:—

1. An illuminating device comprising an electric discharge tube containing a gas which will be rendered luminous by an electric discharge therethrough, a design formed on the visible face of the tube, means for rotating the tube with the design in such a manner as to keep the design always in view, an uninterrupted supply of discharge current, and means whereby the uninterrupted supply of discharge current will be discharged through the tube at a frequency relative to the speed of rotation that it will cause the design to appear to be stationary.

2. An illumination device comprising a neon tube, a design formed on the visible face of the tube, a rotating shaft, an arm extending from said shaft and on which the neon tube is mounted radially to the shaft, means for rotating the shaft with the design always in view, and means whereby an uninterrupted supply of discharge current of a frequency relatively to the speed of rotation that will cause the design to appear stationary can be transmitted through the neon tube during the rotation of the shaft.

3. An illumination device comprising a neon tube, a rotating shaft, an arm extending from the said shaft and on which the neon tube is mounted diametrically to the shaft, means for covering a portion of the neon tube, means for rotating the shaft, and means whereby a regulated and uninterrupted supply of discharge current can be transmitted through the tube during rotation of the shaft so as to render the uncovered portion of the neon tube visible during the rotation of the shaft.

4. An illumination device comprising an electric discharge tube containing a gas which will be rendered luminous by an electric discharge therethrough, letters formed on the visible face of the tube, means for rotating the tube with the letters in such a manner as to be always in view, means for supplying an uninterrupted supply of discharge current to the tube, and a regulator for admitting the discharge current to the tube at such a frequency relatively to the speed of rotation of the tube that the letters will appear sufficiently stationary as to be readable.

5. An illumination device comprising an electric discharge tube having electrodes at each end and containing a gas which will be rendered luminous by an electric discharge between the electrodes, means for rotating the tube transversely to its axis, letters formed on the visible face of the tube, two insulated conductor slip rings, means for rotating them simultaneously with the tube, fixed electric brushes bearing on the said slip rings, electric conductors connecting the slip rings respectively to the electrodes at opposite ends of the tubes, a supply of discharge current, conductors for connecting the discharge current to the circuit of the brushes, and a discharge current admission regulator operated by hand for admitting the discharge current to the tube at such a frequency relatively to the speed of rotation of the tube that the letters will appear sufficiently stationary as to be readable.

6. An illumination device comprising an electric discharge tube containing a gas which will be rendered luminous by an electric discharge therethrough, an open fronted casing for containing the tube, a covering of translucent material for the casing, an opaque design on the translucent material, means for rotating the casing transversely to its axis and with the design in view, an uninterrupted supply of discharge current, and means whereby the uninterrupted supply of discharge current will be discharged through the tube at a frequency relative to the speed of rotation that it will cause the design to appear stationary.

7. An illumination device comprising an electric discharge tube having electrodes at each end and containing a gas which will be rendered luminous by an electric discharge between the electrodes, an open fronted casing for containing the tube, a covering of translucent material for the casing, an opaque design on the translucent material, means for rotating the casing transversely to its axis and with the design in view, two insulator conductor slip rings, means for rotating them simultaneously with the casing fixed electric brushes bearing on the slip rings, electric conductors connecting the slip rings respectively to the electrodes at opposite ends of the tubes, a supply of discharge current, and conductors for connecting it in circuit with both brushes.

8. An illumination device comprising an electric discharge tube containing a gas which will be rendered luminous by an electric discharge therethrough, an open fronted casing for containing the tube, a covering of transparent material for the casing, letters formed on the transparent covering, means for rotating the casing with the letters in view, an uninterrupted supply of discharge current, and a regulator for admitting the discharge current to the tube at such a frequency relative to the speed of rotation of the tube that the letters will be sufficiently stationary as to be readable.

9. An illumination device comprising an electric discharge tube having electrodes at each end containing a gas which will be rendered luminous by an electric discharge between the electrodes, an open fronted casing for containing the tube, a covering of translucent material for the casing, an opaque design on the translucent material, means for rotating the casing transversely to its axis and with the design in view, two insulated conductor slip rings, means for rotating them simultaneously with the tube, fixed electrode brushes bearing on the slip rings, electric conductors connecting the slip rings respectively to the electrodes at opposite ends of the tube, a supply of discharge current, conductors for connecting the discharge current to the circuit of the brushes, and an admission regulator operated by hand for admitting current to the tube at such a frequency relative to the speed of rotation of the tube that the design will appear to be sufficiently stationary as to be distinguishable.

In witness whereof I affix my signature.

ALBAN JOSEPH ROBERTS.